United States Patent
Frankel (10) Patent No.: US 7,172,382 B2
(45) Date of Patent: Feb. 6, 2007

(54) LOADING ASSEMBLY FOR TRANSPORT CONTAINERS, AND RELATED METHOD OF USE

(76) Inventor: Nathan Frankel, P.O. Box 3793, Rancho Cucamonga, CA (US) 91729

( * ) Notice: Subject to any disclaimer, the term of this patent is extended or adjusted under 35 U.S.C. 154(b) by 0 days.

(21) Appl. No.: 10/964,384

(22) Filed: Oct. 12, 2004

(65) Prior Publication Data

US 2006/0078410 A1    Apr. 13, 2006

(51) Int. Cl.
| B65B 21/02 | (2006.01) |
|---|---|
| B65B 69/00 | (2006.01) |
| B65G 1/00 | (2006.01) |

(52) U.S. Cl. ............... 414/403; 414/288; 414/416.03; 414/809

(58) Field of Classification Search ............... 414/403, 414/404, 395, 416.01, 416.03, 416.04, 288, 414/304

See application file for complete search history.

(56) References Cited

U.S. PATENT DOCUMENTS

| 3,040,914 | A | * | 6/1962 | Johnson et al. | ............. | 414/395 |
|---|---|---|---|---|---|---|
| 3,186,566 | A | * | 6/1965 | Spinanger et al. | .......... | 414/395 |
| 3,456,825 | A | * | 7/1969 | Lacoe, Jr. | .................... | 414/403 |
| 3,616,957 | A | * | 11/1971 | Patton | ......................... | 220/1.5 |
| 3,727,777 | A | * | 4/1973 | Hanson | ....................... | 414/400 |
| 3,780,893 | A | * | 12/1973 | Lassig et al. | ............... | 414/809 |
| 3,938,678 | A |  | 2/1976 | Kern |  |  |
| 3,952,887 | A | * | 4/1976 | Lutz | ........................... | 414/392 |
| 3,966,075 | A | * | 6/1976 | Schultz | ...................... | 220/1.5 |

(Continued)

FOREIGN PATENT DOCUMENTS

EP    0 655 403    5/1995

(Continued)

*Primary Examiner*—Eileen D. Lillis
*Assistant Examiner*—Greg Adams
(74) *Attorney, Agent, or Firm*—Sheppard, Mullin, Richter & Hampton LLP (57) ABSTRACT

A loading assembly is provided that is configured to load transport containers with bulk material quickly and efficiently. The assembly includes a load bin having a cross section conforming to an open end of a container and a drive mechanism configured to urge the load bin into and out of the container. When fully inserted, the contents of the load bin are completely disposed within the container. The loading assembly further includes a barrier configured to keep the load confined within the container, while the load bin opens to allow the load to remain within the container upon retraction of the load bin. In this manner, the container can be filled to capacity in a single operation.

20 Claims, 8 Drawing Sheets

U.S. PATENT DOCUMENTS

| | | | |
|---|---|---|---|
| 4,016,991 A * | 4/1977 | Oldford | 414/400 |
| 4,020,958 A | 5/1977 | Wheeler | |
| 4,125,196 A | 11/1978 | Lieberman et al. | |
| 4,260,317 A * | 4/1981 | Martin et al. | 414/517 |
| 4,522,556 A * | 6/1985 | Shapiro | 414/809 |
| 4,645,406 A | 2/1987 | Cooper et al. | |
| 4,919,582 A * | 4/1990 | Bates et al. | 414/233 |
| 4,976,365 A | 12/1990 | Seo | |
| 5,026,228 A | 6/1991 | Mansfield | |
| 5,054,987 A * | 10/1991 | Thornton | 414/390 |
| 5,082,415 A * | 1/1992 | Hayashi | 414/343 |
| 5,186,596 A * | 2/1993 | Boucher et al. | 414/395 |
| 5,564,767 A | 10/1996 | Strepek | |
| 6,048,167 A | 4/2000 | Lesmeister et al. | |
| 6,138,557 A | 10/2000 | Brown et al. | |
| 6,168,371 B1 | 1/2001 | Lesmeister et al. | |
| 6,312,206 B1 | 11/2001 | Pylate et al. | |
| 6,427,585 B1 | 8/2002 | Brown et al. | |
| 2002/0094258 A1* | 7/2002 | Iwasaki et al. | 414/392 |
| 2003/0047561 A1 | 3/2003 | Neto | |

FOREIGN PATENT DOCUMENTS

| WO | WO 03/080481 | 10/2003 |
|---|---|---|

* cited by examiner

LOADING ASSEMBLY FOR TRANSPORT CONTAINERS, AND RELATED METHOD OF USE

BACKGROUND OF THE INVENTION

The present invention relates generally to assemblies for loading containers and, more particularly, to assemblies for loading transport containers with bulk materials.

Efficient trade is highly dependent upon standardization of freight, including size and weight requirements. Such standards allow common carriers, e.g., train, semi-tractor trailers, and water vessels, to optimize space and to streamline loading and unloading of cargo. As a result, common carriers typically provide lower rates for freight housed in standard transport containers. Transport containers conforming to prescribed standards are ubiquitous in commerce, particularly international trade. Such transport containers include standard 40-ft. containers, 40-ft, high-cube containers, and standard 20-ft. containers, having dimensions set forth in Table 1, as follows:

TABLE 1

Exemplary Container Dimensions (approx.)

| Outside Dimensions | | | Inside Dimensions | | |
|---|---|---|---|---|---|
| Length | Width | Height | Length | Width | Height |
| Std. 40-ft. Containers | | | | | |
| 40 ft. | 8 ft. | 8 ft. 6 in. | 39 ft. 6 in. | 7 ft. 8 in. | 7 ft. 10 in. |
| 12192 mm | 2438 mm | 2591 mm | 12040 mm | 2337 mm | 2387 mm |
| 40-ft., High-Cube Containers | | | | | |
| 40 ft. | 8 ft. | 9 ft. 6 in. | 39 ft. 6 in. | 7 ft. 8 in. | 8 ft. 9 in. |
| 12192 mm | 2438 mm | 2896 mm | 12040 mm | 2337 mm | 2667 mm |
| Std. 20-ft. Containers | | | | | |
| 20 ft. | 8 ft. | 8 ft. 6 in. | 20 ft. | 7 ft. 8 in. | 7 ft. 10 in. |
| 6096 mm | 2438 mm | 2591 mm | 6096 mm | 2337 mm | 2387 mm |

Notably, the dimensions of these containers are configured to facilitate transport of multiple containers in both sizes on the same means of transportation. Shipping freight in non-standard containers can greatly increase costs. Thus, to control costs, it is beneficial to load cargo into standard transport containers. To load a container efficiently, current loading approaches typically require that the items be palletized. However, palletizing a load of bulk materials, such as scrap metal, often is unfeasible, particularly since such bulk materials are non-uniform in shape. Instead, such bulk materials commonly are carried into the container with skid-steer loaders and dumped in place.

Although skid-steer loaders are generally effective in transferring bulk materials, loading a container in this manner has a number of shortfalls. The confined space of the container limits the size of the skid-steer loader that can be used, requiring many trips to load the container. Moreover, such loaders have great difficulty stacking material beyond a certain height within the container. To dispense its load, the loader's bucket is lifted in proximity to the container's ceiling and, then, tipped downward to dump its load. Thus, loading the container to capacity can be challenging and time consuming. Moreover, due in part to the precision required in operating the loader, any operator error poses a likely risk of damage to the container as well as potential worker injury.

It should, therefore, be appreciated that there remains a need for a loading assembly that can load transport containers quickly and efficiently. The present invention fulfills this need and others.

SUMMARY OF THE INVENTION

The invention resides in a loading assembly configured to load transport containers, particularly with bulk materials, quickly and efficiently. The assembly includes a load bin having a cross section conforming to an open end of a container and a drive mechanism configured to urge the load bin into and out of the container. When fully inserted, the contents of the load bin are completely disposed within the container. The loading assembly further includes a barrier configured to keep the load confined within the container, while the load bin opens to allow the load to remain within the container upon retraction of the load bin.

More specifically, and by way of example, the load bin defines a volume configured to hold a load of sufficient size to fill the container to capacity in a single operation. The loading assembly also includes a support structure having a base support disposed below the load bin and a drive mechanism configured to enable displacement of the load into the container through the open end thereof and to retract the load bin from the container following displacement. A barrier assembly is configured to engage the support structure such that it locks in place adjacent to the open end of the container during retraction of the load bin, allowing the contents of the bin to remain within the container during and after removal of the bin.

In a detailed aspect of an exemplary embodiment of the invention, the load bin includes a floor, two side walls, an end wall, and a movable front wall. The load bin is preferably configured to hold a load of sufficient size at least to meet the capacity of the container to include volume and weight. Also, the loading assembly is operable with a load in excess of 22,000 pounds. The front wall of the load bin can include a door that opens to allow the load to exit the load bin upon retraction thereof, thereby allowing the load to remain within the container.

In another detailed aspect of an exemplary embodiment of the invention, the front wall of the load bin is configured to remain within the container upon retraction of the load bin.

In yet another detailed aspect of an exemplary embodiment of the invention, the end wall can be positioned such that the internal volume of the load bin conforms to prescribed container sizes.

In yet another detailed aspect of an exemplary embodiment of the invention, the floor of the load bin is movable relative to the side walls such that the floor can be displaced while within the container.

In yet another detailed aspect of an exemplary embodiment of the invention, the loading assembly includes a support structure having a base support disposed below the load bin. The barrier assembly is configured to engage the support structure such that it locks in place adjacent to the open end of the container during retraction of the load bin. Moreover, the barrier assembly preferably can be positioned in the load bin, prior to loading, to conform the internal volume of the load bin to prescribed container sizes.

The invention also provides a method of loading a transport container. By way of example, the method includes positioning a transport container and a loading assembly relative to one another such that the loading assembly is adjacent to an open end of the container. The loading assembly includes a load bin that can be displaced into the container by a drive mechanism. The load bin has a cross section conforming to an open end of a container such that the load bin can be inserted therethrough and defining a top opening in for receiving a load. The loading assembly further includes a barrier assembly configured to confine the contents of the bin in the container while the bin is retracted, allowing the contents of the bin to remain within the container upon removal of the bin. In use, the load bin is inserted through the open end of the container until the load is fully disposed within the container. The barrier assembly is positioned adjacent to the open end of the container. The load bin is then retracted with the barrier assembly in place, such that the load remains within the container.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
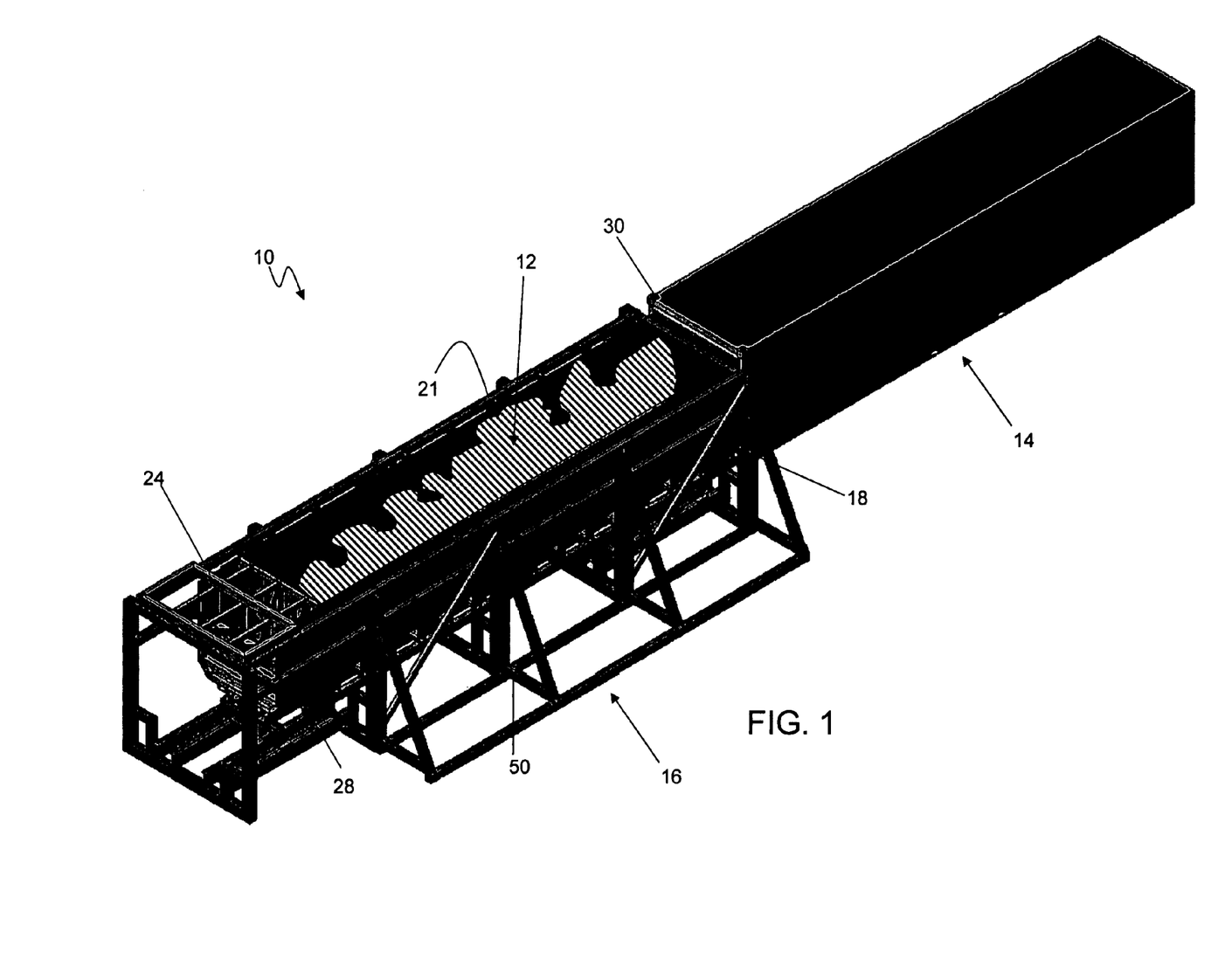
FIG. 1 is a perspective view of a loading assembly in accordance with the present invention, depicting a load bin of the loading assembly aligned with an opening of a transport container.

Referring now to the drawings, and particularly to FIG. 1, there is shown a loading assembly 10 configured to load bulk material 12, e.g., scrap metal, into transport containers 14. The loading assembly includes a support structure 16 and a load bin 18 sized to conform to the internal dimensions of the container. The load bin has an open top 21, allowing it to be top-loaded to facilitate efficient loading of bulk material. The assembly includes a drive mechanism 22 (FIG. 9) configured to urge the load bin into and out of the container. When fully inserted, the contents of the load bin are completely disposed within the container. The loading assembly further includes a barrier assembly 24 configured to keep the load confined within the container and a gate 26 that allows the bulk material to exit the load bin upon retraction. In this manner, the container can be loaded to capacity with bulk material quickly and efficiently.

FIGS. 1–4 depict sequential operation of the loading assembly 10, with the container 14 in phantom for visibility. The loading assembly operates through several phases, including material loading (FIG. 1), transfer (FIG. 2), and retraction (FIGS. 3 and 4), thereby loading the container to capacity in a single operation. During the loading phase, the load bin 18 is preferably disposed within the support structure 16, allowing the load bin to be top loaded, even while aligned with the container. The load bin is filled with bulk material 12 up to a desired level. For example, the load assembly can be used with both 20-ft and 40-ft containers. When loading a 20-ft container, the barrier 24 can be positioned at a midpoint along the load bin, thereby defining in volume that conforms to the internal volume of a 20-ft container. When loading a 40-ft container, the barrier is positioned at an end wall 28 of the load bin. Operators can fill the load bin with bulk material via the open top 21, as desired.

Figure 3:
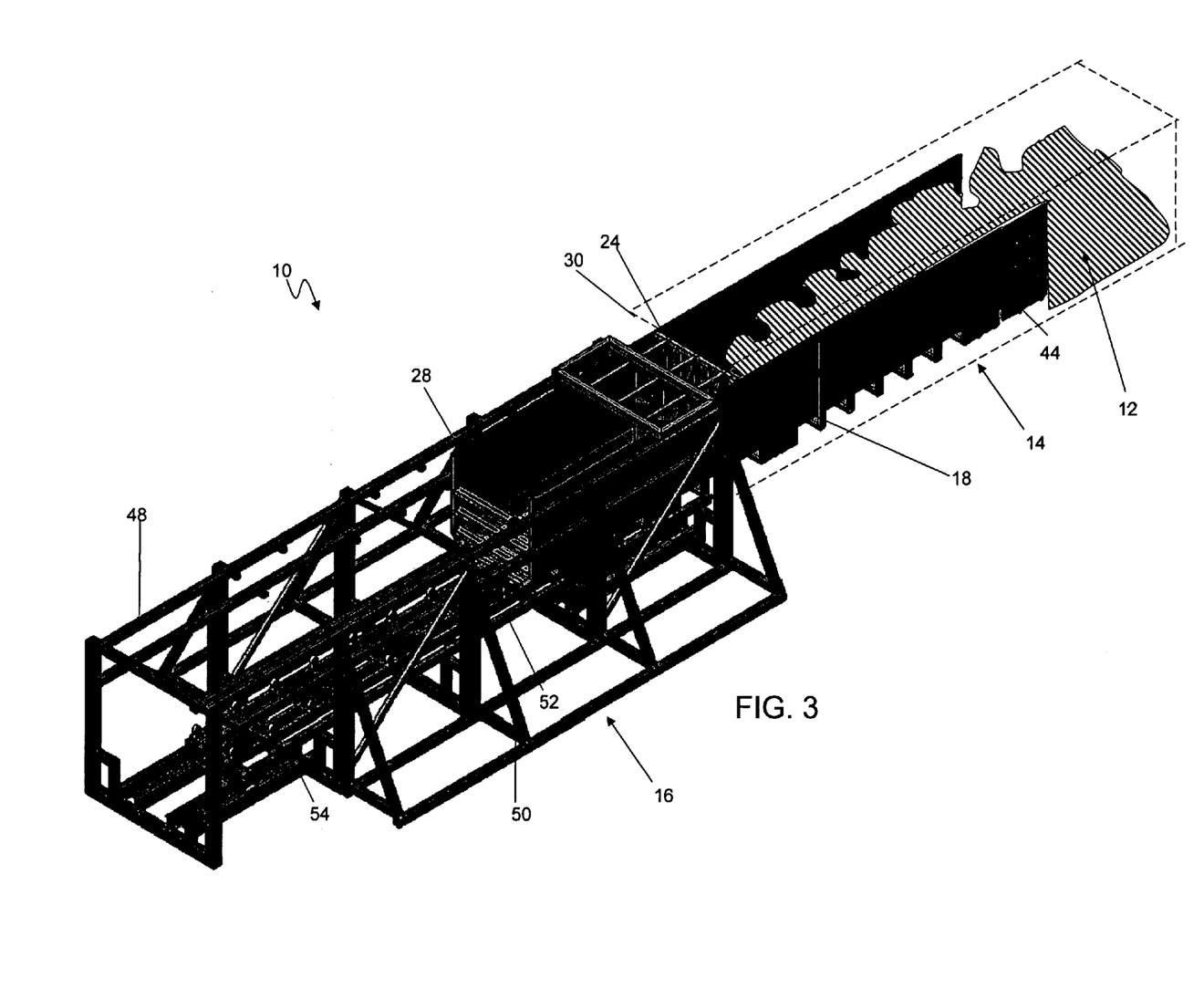
FIG. 3 is a perspective view of the loading assembly of FIG. 1, depicting the load bin partially withdrawn from the container (in phantom) and having a gate of the bin open.
Figure 4:
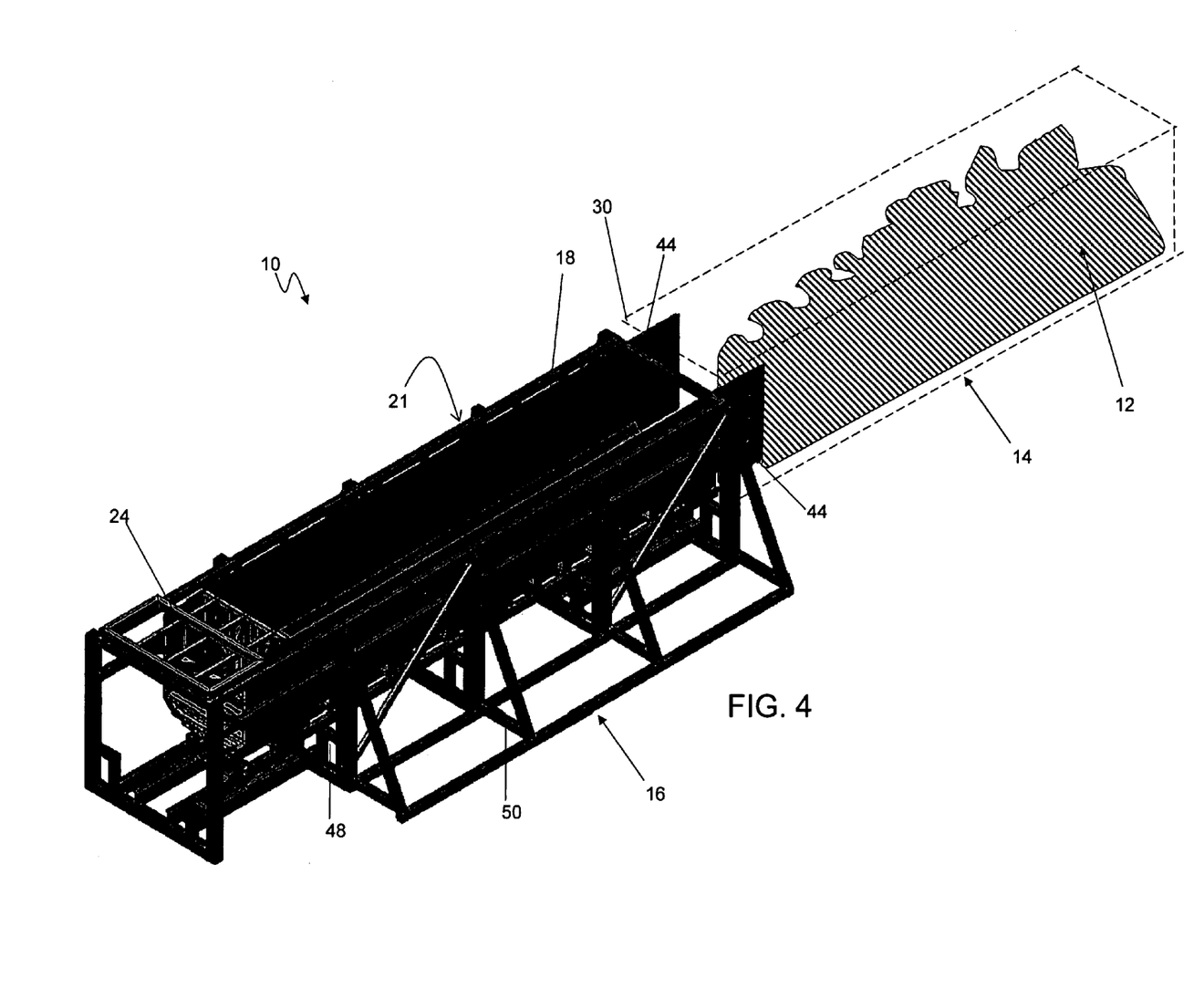
FIG. 4 is a perspective view of the loading assembly of FIG. 1, depicting the load bin fully withdrawn from the container (in phantom).

Once loaded, the transfer phase can be initiated. In this phase, the drive mechanism 22 urges the load bin 18 into the container 14. This phase continues until the contents of the load bin are fully disposed within the container. When desired, the load bin can then be retracted, leaving the bulk material 12 within the container. As best seen in FIG. 3, during the retraction phase, the gate 26 is unlocked, and the barrier 24 remains positioned against an open end 30 of the container. The drive mechanism retracts the load bin from the container until the bin is removed from the container (FIG. 4), at which point the container is free for transport.

Figures 5, 6:
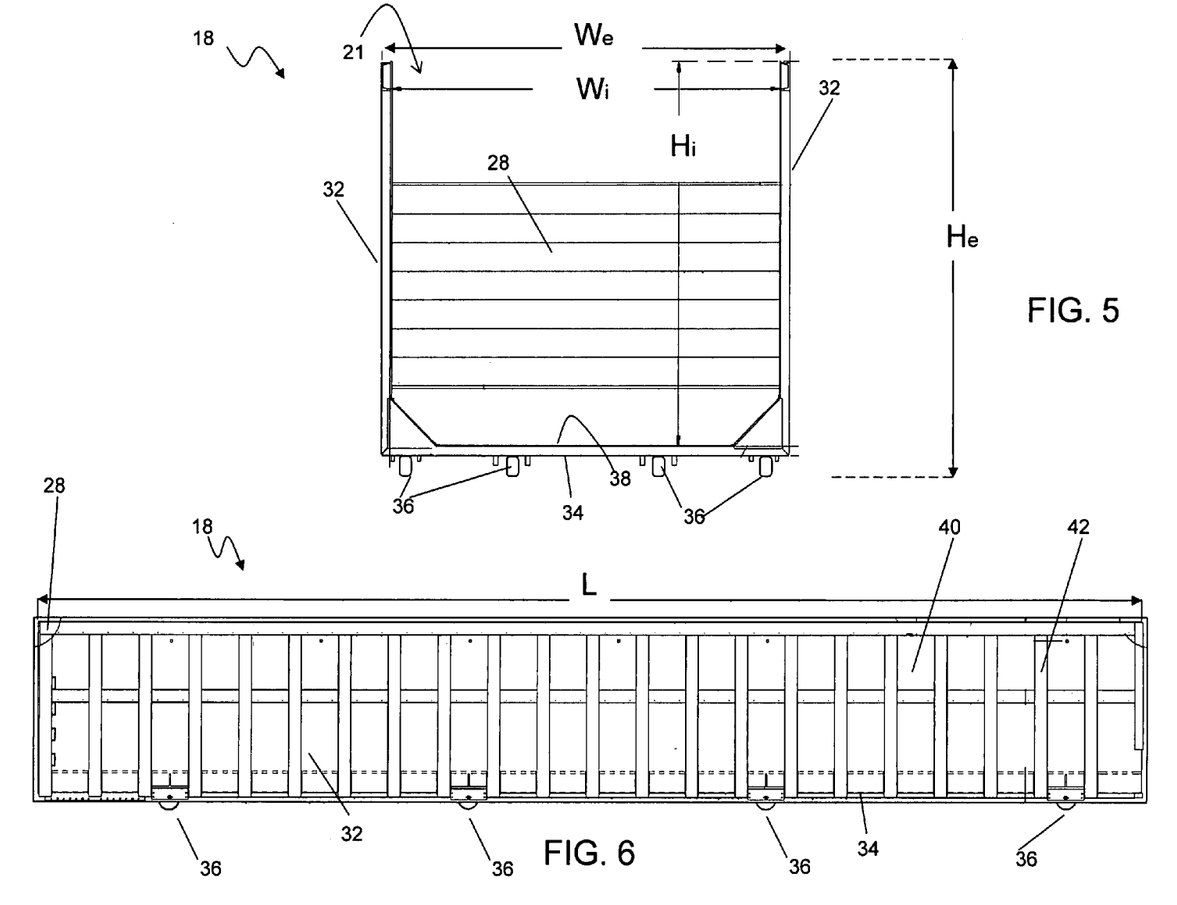
FIG. 5 is a front elevational view of the load bin of the loading assembly of FIG. 1, with the gate excluded for clarity.
FIG. 6 is a side elevational view of the load bin of the loading assembly of FIG. 1.

With reference to FIGS. 1, 5 and 6, the load bin 18 includes sidewalls 32, a bottom wall 34, and the end wall 28 spaced from the gate 26. In the exemplary embodiment, the load bin is sized to conform to the internal dimensions of typical 20-ft. or 40-ft. transport containers. More particularly, the load bin has an external height ($H_e$) of about 7 ft., an external width ($W_e$) of about 7 ft., 5 in., and a length (L) of about 44 ft., 4 in. The load bin has an internal height ($H_i$) of about 6 ft. 10 in., an external width ($W_i$) of about 7 ft., 4 in. The load bin also includes roller 36 along the bottom wall to aid in smooth movement of the bin along the container. Other embodiments are contemplated having a load bin sized to conform to containers of various other sizes, e.g., railroad cars, storage containers, and semi trailers. The load bin can be loaded to capacity easily with bulk material, and it can effectively hold bulk material having a high degree of variability in make-up. For example, the load bin can hold a single load of scrap steel having pieces varying size from as small as 0.01 in.×1 in.×0.25 in. (0.25 mm×25 mm×0.635 mm) up to and in excess of 5 ft.×3 ft.×1 ft. (1.52 m×0.3 m m).

To facilitate operation of the loading assembly 10, interior surfaces 38 of the load bin 18 are relatively smooth, free of excessive ridges and grooves, such that the load bin can be retracted without having bulk material unduly catching the surface, particularly during retraction. In the exemplary embodiment, the walls of the load bin include steel paneling 40 supported by reinforcing beams 42 spaced along the length of the load bin. The interior surfaces are defined by the paneling of the walls of the load bin. Optionally, supplemental materials or coatings can be used for the interior surfaces to facilitate retraction of the load bin. For example, in other embodiments, the load bin can include rollers disposed along interior surfaces to facilitate loading of the container.

Figure 7:
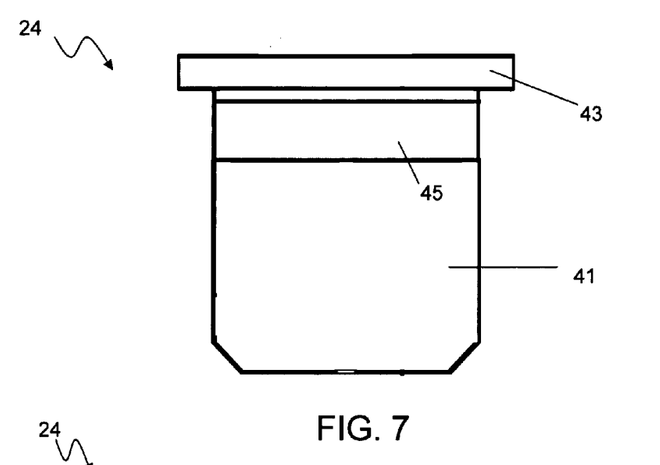
FIG. 7 is a front elevational view of the barrier assembly of the loading assembly of FIG. 1.
Figure 8:
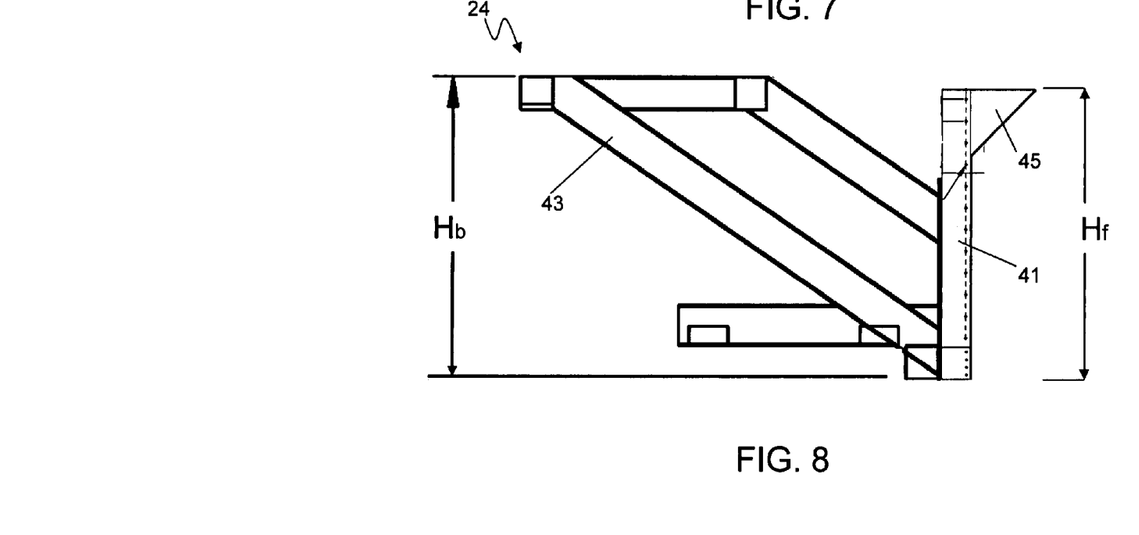
FIG. 8 is a side elevational view of the barrier assembly of the loading assembly of FIG. 1.

With reference now to FIGS. 7 and 8, the barrier 24 includes a leading wall 41 attached to a brace 43. The leading wall is configured to closely conform to the interior dimensions of the load bin and includes a forward projection 45 that aids in confining the bulk material 12 in front of the leading wall throughout operation of the loading assembly. In the exemplary embodiment, the leading wall has a height ($H_f$) of about 6 ft., 8 in., while the overall height ($H_b$) of the barrier is about 7 ft, 6 in. The upper portion of the barrier extends out the open top 20 of the load bin and is guided along the support structure 16.

As shown in FIGS. 1–4, the gate 26 of the load bin 18 includes two doors 44 hinged to corresponding sidewalls 32 and a locking mechanism for securing the doors closed. During loading and transfer of the bulk material, the gate is configured to remain secure. Once the load bin is fully inserted into the container, the gate is unsecured, enabling the load to remain in the container upon withdrawal of the load bin. In the exemplary embodiment, the locking mechanism is released by remote activation initiated by the operator; however, various other approaches can be used, e.g., hydraulic or electric linkage to open, gravity to open, or spring loaded. Moreover, other approaches can be used for allowing the load to remain in the container upon removal of the bin. For example, various gate configurations can be used, such as, rolling track doors and horizontally hinged doors. Also, sacrificial doors can be used, e.g., in which the door is configured to remain in the container or to deteriorate or to be destroyed upon retraction of the load bin. In yet other embodiments, the load bin can be configured without a gate. Instead, material can be positioned to serve as a sacrificial end wall such that it remains in the bin during transfer and remains in the container upon removal of the load bin. For example, a large piece of scrap steel can be position near the open end in manner that retains the material within the bin during loading yet allows the load to remain within the container during retraction. In selected embodiments, the floor of the load bin can be configured to be movable relative to the side walls such that the floor can be displaced while within the container, allowing the load to remain in the container.

Figure 2:
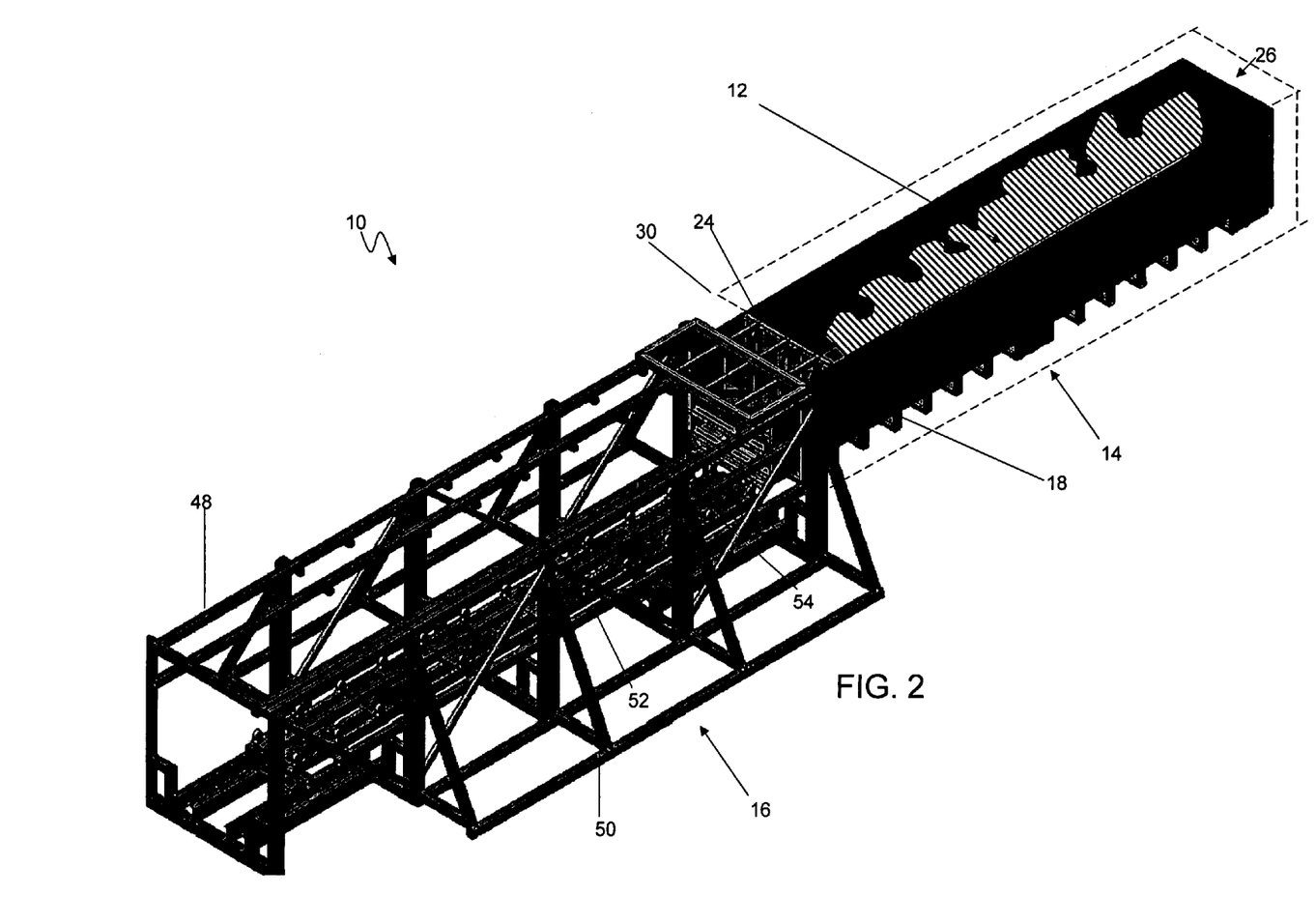
FIG. 2 is a perspective view of the loading assembly of FIG. 1, depicting the load bin fully extended into the container (in phantom) and a barrier assembly disposed adjacent to the opening of the container.

With reference now to FIG. 2, the support structure 16 is configured to promote stability of the load assembly 10 during all phases of operation. In the exemplary embodiment, the loading assembly is configured to transfer a load of in excess of about 58,000 pounds (approx. 26,300 kg).

The support structure includes external framing 48 disposed about the load bin 18, side buttresses 50, and a base support 52. The load assembly can be disassembled for transportation, if desired. The support structure can be disassembled and housed within the load bin. The overall weight of the load assembly is less than 42,000 pounds, making it convenient for transport. The base support is positioned below the bottom wall 34 (FIG. 5) of the load bin and includes a plurality of rollers 54 to facilitate longitudinal movement of the load bin. In the exemplary embodiment, the base support is integrated with a weight scale (not shown) to provide weight measurement of the load. Optionally, the base support can be configured to move in support of operation of the load assembly. For example, the load assembly can be configured to aid in aligning the load bin with the container, e.g., via movement of the base support, including lateral and vertical adjustments. Also, the base support can be configured to tilt and vibrate to facilitate in dispensing the load within the container.

With reference to FIGS. 1–4 and 9–11, the drive mechanism 22 is configured urge the load bin 18 into and out of the container 14, through the transfer and retraction phases, in a timely manner. The drive is attached to the support structure 16 and the load bin and provides a cycle time through the transfer and retraction phases of less than about 8 minutes. The drive mechanism includes a hydraulic cylinder 56 and a cable assembly 58 operatively connected to the load bin. The hydraulic cylinder includes a piston 60 disposed in a cylinder housing 62. The cable assembly includes pulley blocks 64 disposed on opposite ends of a support beam 66 with cabling 68 looped around the pulley blocks.

Figure 9:
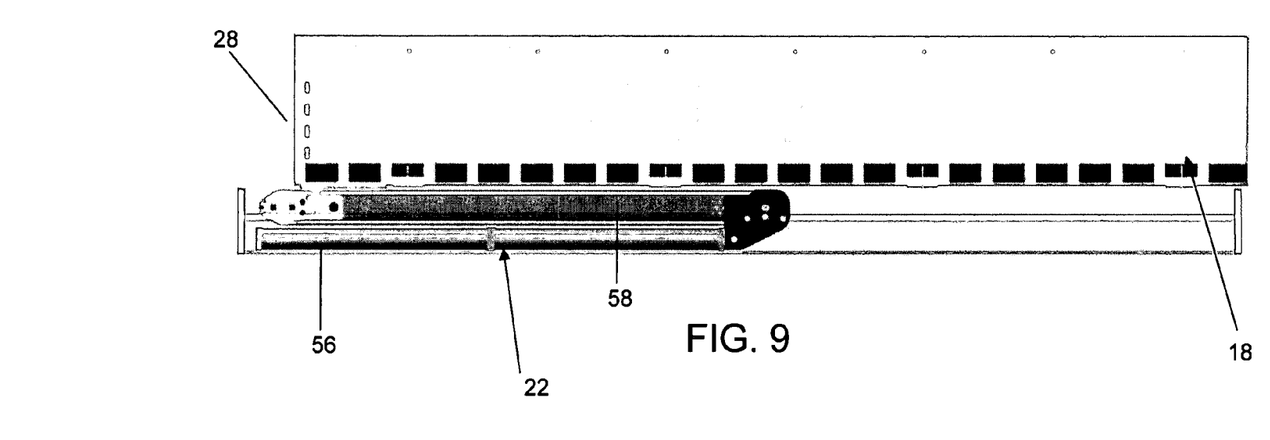
FIG. 9 is a side elevational view of the drive mechanism and load bin of the loading assembly of FIG. 1, depicting the load bin retracted.
Figure 10:
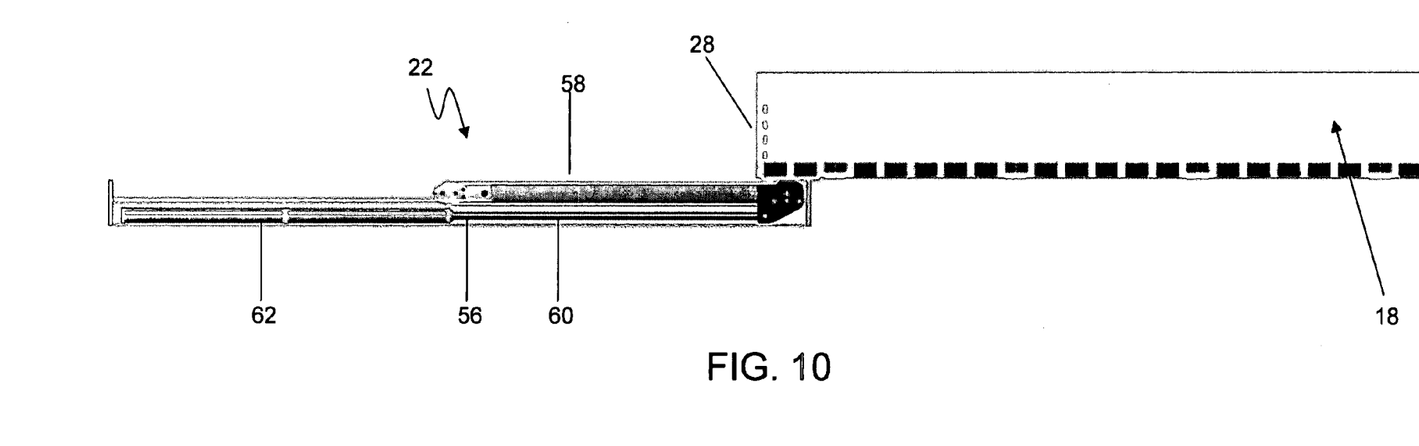
FIG. 10 is a side elevational view of the drive mechanism and load bin of the loading assembly of FIG. 1, depicting the load bin fully extended.
Figure 11:
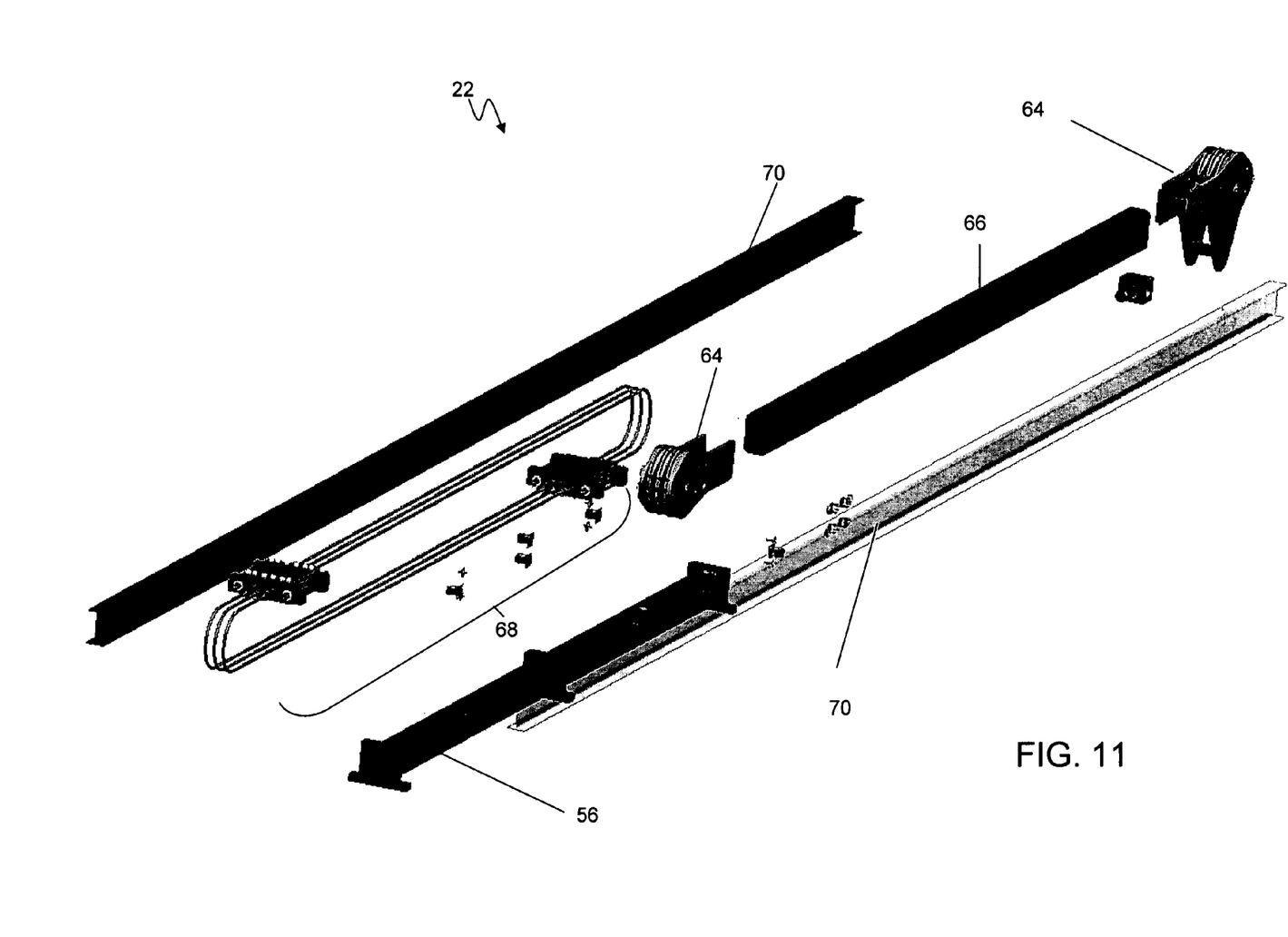
FIG. 11 is an exploded perspective view of the drive mechanism of the loading assembly of FIG. 1.

The drive mechanism 22 is aligned between two guide beams 70 (FIG. 11) below the bottom wall of the load bin 18. As best seen in FIGS. 9 and 10, the hydraulic cylinder displaces the cable assembly and, in turn, the load bin. The piston 60 of the hydraulic cylinder can extend over 20 feet out the cylinder housing 62. The cable assembly can further displace the load bin, approximately 20 feet. In the exemplary embodiment, a hydraulic drive mechanism is used; however, various other drive mechanisms can be used, e.g., electric, gas or diesel engine. Moreover, various other approaches can be used for translating the force from the drive mechanism in to movement of the load bin, e.g., piston, rack and pinion, belt drive, cable/drum, chain/sprocket, and gear reduction.

It should be appreciated from the foregoing that the present invention provides a loading assembly configured to load transport containers with bulk material quickly and efficiently. The assembly includes a load bin having a cross section conforming to an open end of a container and a drive mechanism configured urge the load bin into and out of the container. When fully inserted, the contents of the load bin are completely disposed within the container. The loading assembly further includes a barrier configured to keep the load confined within the container, while the load bin opens to allow the load to remain within the container upon retraction. In this manner, the container can be filled to capacity in a single operation.

Although the invention has been disclosed in detail with reference only to the exemplary embodiments, those skilled in the art will appreciate that various other embodiments can be provided without departing from the scope of the invention. Accordingly, the invention is defined only by the claims set forth below.

I claim:

1. A loading assembly for use with a transport container having an open end, comprising:
    a load bin sized to be inserted into a transport container through an open end thereof, the load bin including a floor, two side walls, and a movable front wall;
    a barrier assembly including a wall disposed within the load bin, spaced from the movable front wall thereof,
    wherein the load bin and the barrier assembly cooperate to define a volume configured to hold an unpalletized load of sufficient size to fill the transport container to capacity in a single operation, and wherein the load bin and the barrier assembly further cooperate to define a top opening for receiving an unpalletized load;
    a stationary support structure including a base support disposed below the load bin and a pair of upstanding side supports disposed on opposing sides of the load bin; and
    a drive mechanism coupled to the load bin to move the load bin into the transport container through the open end thereof and to retract the load bin from the container;
    wherein the barrier assembly is configured to engage the stationary support structure when the drive mechanism has moved the load bin into the transport container, to lock the barrier assembly adjacent to the open end of the container, such that when the drive mechanism thereafter retracts the load bin from the container, the wall of the barrier assembly retains the unpalletized load within the container.

2. A loading assembly as defined in claim 1, wherein the barrier assembly can be positioned in the load bin, prior to loading, to conform the internal volume of the load bin to prescribed container sizes.

3. A loading assembly as defined in claim 1, wherein the load bin is configured to hold a load in excess of 22,000 pounds.

4. A loading assembly as defined in claim 3, wherein the movable front wall of the load bin includes a door that can open to allow the unpalletized load to exit the load bin upon retraction thereof, thereby allowing the load to remain within the container.

5. A loading assembly as defined in claim 3, wherein the movable front wall of the load bin is configured to remain within the container upon retraction of the load bin.

6. A loading assembly as defined in claim 3, wherein the barrier assembly is configured to be positioned to conform the internal volume of the load bin to prescribed container sizes.

7. A loading assembly as defined in claim 1, wherein the wall of the barrier assembly includes an upper portion that engages the side supports of the stationary support structure.

8. A loading assembly as defined in claim 1, wherein the base support is configured for lateral and vertical adjustments to aid in aligning the load bin with the transport container.

9. A loading assembly as defined in claim 1, wherein the barrier assembly is supported by the side supports of the support structure.

10. A loading assembly as defined in claim 1, wherein the drive mechanism includes a hydraulic cylinder and a cable assembly coupled to the hydraulic cylinder and to the load bin.

11. A method of loading a transport container, comprising:
    positioning a transport container and a loading assembly relative to one another such that the loading assembly is adjacent to an open end of the container, the loading assembly including
        a load bin including a floor, two side walls, and a movable front wall,
        a barrier assembly having a wall disposed within the load bin, spaced from the movable front wall,
        wherein the load bin and the barrier assembly cooperate to define a volume configured to hold an unpalletized load of sufficient size to substantially fill the transport container to capacity in a single operation, and wherein the load bin and the barrier assembly further cooperate to define a top opening for receiving an unpalletized load,
        a stationary support structure for supporting the load bin and the barrier assembly while in a position adjacent to the open end of the transport container, and
        a drive mechanism configured to move the load bin into the transport container through the open end thereof;
    loading the load bin with an unpalletized load through the top opening;
    operating the drive mechanism so as to move the load bin into the transport container through the open end thereof until the unpalletized load is fully disposed within the container, while the container is maintained generally stationary;
    engaging the barrier assembly with the stationary support structure after the drive mechanism has been operated to move the load bin into the transport container, to lock the barrier assembly adjacent to the open end of the container; and
    operating the drive mechanism so as to retract the load bin from the transport container, while the barrier assembly remains engaged with the stationary support structure, such that the load remains within the container.

12. A method as defined in claim 11, further comprising:
    disengaging the barrier assembly from the support structure; and
    sliding the barrier assembly to a retracted position, disposed within the load bin.

13. A method as defined in claim 11, wherein the drive mechanism includes a hydraulic cylinder and a cable assembly coupled to the hydraulic cylinder and to the load bin.

14. A method as defined in claim 11, wherein the stationary support structure includes side supports disposed on opposing sides of the load bin.

15. A method as defined in claim 14, wherein the barrier assembly further includes a brace coupled to the wall of the barrier assembly and supported by the side supports of the support structure.

16. A loading assembly for use with a transport container having an open end, comprising:
    a load bin sized to be inserted into a transport container through an open end thereof, the load bin including a floor, two side walls, and a movable front wall;
    a barrier assembly including a wall disposed within the load bin that conforms to the internal dimensions of the load bin, and further including a brace coupled to the wall;
    wherein the load bin and the barrier assembly cooperate to define a volume configured to hold an unpalletized load of sufficient size to fill the transport container to capacity in a single operation, and wherein the load bin and the barrier assembly further cooperate to define a top opening for receiving an unpalletized load;

a stationary support structure disposed about the load bin; and a drive mechanism coupled to the load bin to move the load bin into the container through the open end thereof and to retract the load bin from the container;

wherein the barrier assembly is configured to engage the stationary support structure when the drive mechanism has moved the load bin into the transport container, to lock the barrier assembly in place adjacent to the open end of the container during retraction of, such that when the drive mechanism thereafter retracts the load bin from the container, the barrier assembly retains the unpalletized load within the container.

17. A loading assembly as defined in claim 16, wherein the drive mechanism includes a hydraulic cylinder and a cable assembly coupled to the hydraulic cylinder and to the load bin.

18. A loading assembly as defined in claim 16, wherein the movable front wall of the load bin includes a door that can open to allow the load to exit the load bin upon retraction.

19. A loading assembly as defined in claim 16, wherein the brace extends above the load bin and is supported by side supports of the support structure.

20. A loading assembly as defined in claim 19, wherein the side supports are configured to support the barrier assembly throughout the range of movement of the barrier assembly in an operational cycle.

* * * * *